Figure 1:
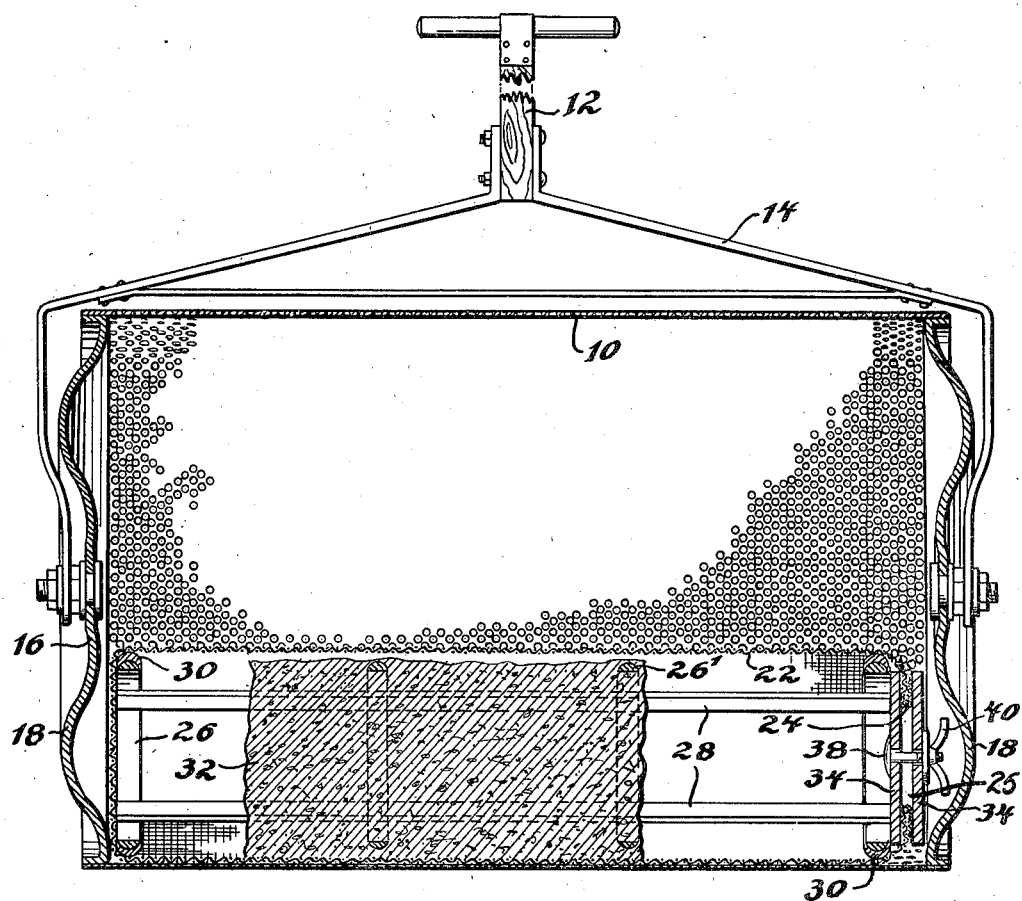

March 1, 1938.                W. W. SCHUMACHER                 2,109,851
                  PROCESS AND APPARATUS FOR LAYING CONCRETE
                           Filed Sept. 14, 1933

INVENTOR.
William W. Schumacher
BY
Swan, Frye & Hardesty
ATTORNEYS.

Patented Mar. 1, 1938

2,109,851

UNITED STATES PATENT OFFICE 2,109,851

PROCESS AND APPARATUS FOR LAYING CONCRETE

William W. Schumacher, Detroit, Mich.

Application September 14, 1933, Serial No. 689,437

15 Claims. (Cl. 94—50)

This invention relates to processes of and apparatus for laying concrete, and is particularly directed to improving the quality and reducing the time, effort and expense involved in the laying of concrete in substantially flat layers such as comprise floors, pavings, and the like.

One of the chief sources of trouble in the laying of concrete, which has been responsible more often than any other single cause for the unsatisfactory nature and early failure of many concrete structures, is the water-cement ratio. When the percentage of water incorporated in the mix is increased beyond a certain point, the quality and strength of the concrete resulting upon setting of the paste decreases rapidly. The actual difference, however, in quantity of contained water, between a poor mix containing too much water and which results in inferior concrete, and a proper mix resulting in stronger, denser, waterproof concrete, is but slight. The wetter mixes, though producing much poorer results, are much easier for the workmen to handle and lay, since they flow easily, and are more easily worked, being more plastic. The difference in labor involved as between the use of wet and dry mixes is considerable, as drier mixtures must be tamped and worked much more to insure proper intermixture of the paste and aggregates, flowage into the corners of forms, etc. Despite the extra expense and labor, such drier mixtures have been commonly used where desired quality of finished work with respect to strength and resistance to water, wear and erosion has justified it. It has been found, however, that workmen and contractors frequently yield to the temptation to add more water than the specifications under which they may be working call for, in order to lighten and simplify their labor; but since, as stated above, the addition of a relatively small quantity of water frequently very harmfully affects the quality of the resultant concrete, this practice has resulted in the production of much faulty construction and concrete which quickly disintegrates under the action of water and laitance, oils and chemicals, and which erodes and crumbles easily by reason of insufficient hardness and density.

Investigation has disclosed the fact that the quantity of water in the paste which is effective in determining its properties after setting is that which actually remains therein as the concrete lies in place during its final consolidation or setting;—in other words that present during the chemical reaction which occurs when cement paste sets to form concrete.

It has heretofore been suggested that excess moisture be removed from a wet mix, to attain such advantages incident to the presence of less water during final consolidation, by applying an absorbent to the surface of freshly laid concrete in the nature of a porous tarpaulin over which is sprinkled, as an absorbent, dry cement mixed with sand or other aggregates. Patent Number 1,127,957 was issued, February 9, 1915, to P. M. Bruner, covering the process just mentioned, the application of which process does considerably improve the quality of concrete resulting from a wet mix. The basic object of the effort to use a wet mix and nevertheless obtain concrete of high quality was only partially attained by this method, however, because the laying of the tarpaulin and the handling thereof and of the absorbent thrown thereover in itself required considerable labor, several men ordinarily being occupied at this work. The Bruner method, also, was chiefly effective only in the removal of surface water, since it had no agitating effect and the unit pressure exerted by the tarpaulin and light coating of dry sand and cement was insufficient to force water to the surface from any depth, while of course, tamping would not only be inconvenient with a wet mix, but if such additional labor were to be used, a drier mix might as well have been employed in the first place.

With the foregoing considerations in mind, I propose to so treat freshly laid concrete as to provide means whereby excess moisture may be removed, before the consolidation process has set in, more quickly and efficiently and with a lesser expenditure of labor than is involved in practicing the processes heretofore known, and to provide for simultaneously compacting and agitating the concrete sufficiently to force moisture to the surface from within, and in addition, also simultaneously, to provide means for forcing coarser aggregates beneath the surface, thereby facilitating subsequent troweling and enabling finishing the top stratum as a smooth, dense surface, in a highly desirable manner. The foregoing aims constitute the principal objects of my invention. Others will be apparent, however, from the following description, wherein reference is made to the accompanying drawing illustrating a preferred embodiment of a structure adapted for use in conjunction with the practice of my invention, and wherein similar reference numerals designate similar parts throughout.

Figure 2:
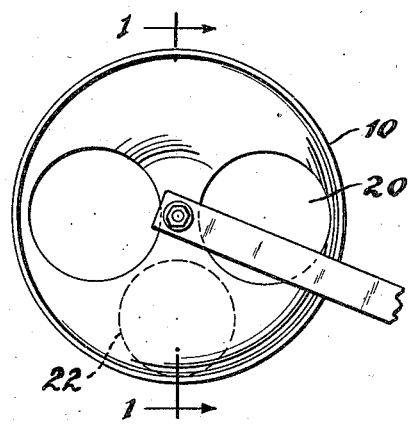

Figure 1 is a vertical sectional view of concrete treating apparatus in the form of a roller of special construction, incorporating the principles of my invention, portions being broken away to afford clearer views of other parts; and Figure 2 is a side elevation of the same.

Preferably, in laying concrete in accordance with my improved process, somewhat more water is incorporated in the mix than is desirable to be left therein during consolidation if maximum qualities of strength, density, etc., are to be secured as pointed out above. In fact virtually any quantity of water may be used to give the mix the desired plasticity. After flowing or otherwise placing the plastic mix in the desired position, I preferably apply thereto a weighted absorbing device capable of exerting considerable unit pressure upon the concrete and adapted to be moved over the entire surface. While I have shown mechanism for accomplishing these ends in the form of a roller, it will be apparent that such form need not necessarily be followed, although that form provides convenient means for moving the weighted absorbing device over the surface. Preferably also incorporated in such mechanism for simultaneous application therewith to the concrete, is a reticulated or foraminated pressing surface forming part of the compacting member and arranged and apertured to force beneath the surface of the plastic cement all aggregates larger than those of a predetermined size, thereby leaving upon the surface only the finer aggregates and cement paste, which when smoothed thereover in the subsequent finish troweling or floating operation impart a dense, hard and smooth coating. The perforations also increase the agitating effect of the roller, thereby further assisting in forcing water to the surface.

My preferred roller construction for utilization in achieving these results is clearly shown in the drawing. A reticulated cylindrical shell 10 is provided, perforated over its entire active area, as shown, the perforations being relatively fine and of such character that water may easily be drawn thru them and into the roller by the absorbing element within, but preferably not so fine that capillarity tends to assist clogging of the roller. I have had no clogging difficulties with perforations of the order of $\frac{3}{16}$" spaced on $\frac{5}{16}$" centers. While the body of the roller is shown as formed of relatively thin perforated sheet metal, this construction will be seen to be more or less optional, and screening or other suitable pervious material might be used. The roller is shown as equipped with a handle 12 and connecting yoke 14, and these also may be of the usual or any desired construction. The heads 16 of the roller are shown as formed of stamped sheet metal peripherally secured to the shell 10 and contoured to provide each with an inwardly opening concentric annular channel 18 intermediate its center and rim, for a purpose which will subsequently appear. In one or both heads are also formed loading and unloading apertures 20, thru which the absorbent inner roller or cartridge, presently to be described, may be inserted and removed.

The absorbent inner roller may be of any suitable character adapted to absorb or adsorb moisture, and to roll upon the interior bottom surface of the shell as the latter is propelled. The inner roller is preferably of considerable weight and substantially cylindrical form. In the construction shown, the inner roller comprises a jacket 22 of strong fabric such as heavy canvas, provided at one end (altho it might be at both) with a filler opening 25 and formed to be substantially cylindrical when expanded. A reinforcing framework is preferably arranged therewithin adapted to maintain it in substantially cylindrical form. The framework may comprise a plurality of hoops as 26, 26', of slightly smaller diameter than the expanded jacket, held in suitably spaced relation by longitudinal bracing members 28, which may be welded or otherwise secured to the inner surfaces of the hoops. The hoops are shown as of half round cross-section. Over the rounded outer surfaces of the endmost hoops 26 are fitted resilient rubber tires 30. The jacket 22 is drawn over this assembly in the manner clearly shown in Figure 1. The cartridge so formed is then filled with a suitable loose absorbent material such as mixed dry sand and cement, (designated 32) and the end of the cylindrical cartridge is tightly closed. My preferred method of closing the cartridge includes the use of a pair of sealing members in the form of enlarged washers as 34—36, formed of somewhat resilient material such as rubber tiling, and arranged one inside and one outside the filler opening 25. The draw string 24, when drawn tight, preferably does not completely close the opening, and the sealing washers 34—36 are clamped against the inner and outer surfaces of this head of the cartridge by a suitable clamping bolt as 38 extending thru the opening and exteriorly engaging an enlarged wing nut as 40, the arms of which are adapted to serve as handles to assist in manipulating the cartridge during its insertion in and removal from the roller thru one of the apertures 20. As shown in Figure 2, the apertures 20 are somewhat spaced inwardly from the outer cylindrical surface portion 10 of the roller, so that the cartridge cannot move endwise out of the roller save when lifted clear of the shoulders formed by such insetting of these apertures. This arrangement makes closure members for the apertures 20 unnecessary. The annular channel portions 18 will be seen to be so arranged as to provide clearance paths for the wing-nut 40, which may travel therein. The cartridge may thus occupy substantially the full length of the interior of the roller, as shown.

It will be seen that when the absorbent cartridge is loaded and inserted in the manner described, and the roller run over the freshly laid wet concrete, the absorbent material will rapidly draw excess water into itself thru the reticulated shell, and that this action is assisted by the weight of the loaded roller, which by compacting and agitating the concrete forces excess water to the surface and thru the perforations. I have found the absorbing capacity of such a roller to be ample to remove all excess moisture from large areas of concrete, if the roller is formed of a convenient size, such that, for example, its total weight when loaded is perhaps 150 or 200 pounds; although this is entirely optional. It will be seen that the inner absorbent cartridge rolls on the rubber tires 30, which by their resiliency protect the interposed canvas against injury. The inner bracing hoops 26' of the cartridge framework, by reason of their reduced diameter, are somewhat spaced from the walls of the jacket 22 when the latter is filled. As a result, the absorbent material 32 occupies the space between the hoops and the jacket, so that the active absorbent surface is not reduced by the presence of the hoops.

It will of course be obvious that when the cartridge has become loaded with water, it or its contents may be very easily and quickly replaced. I have found that for many of the smaller construction projects one cartridge is more than adequate. In any event, however, after completion of the rolling operation the cartridge is preferably removed, and the jacket 22 rinsed out in water to prevent hardening of any cement paste which may remain therein. The loose absorbent material taken from the cartridge may be employed, if desired, either for additional construction work of the same variety, or for minor finishing such as in concrete for filling holes, "touching up", etc.; or it may be thrown away, the wastage thus occasioned being insignificant.

The invention will be recognized to be broader than the preferred structural embodiment shown in the drawing, and the appended claims are accordingly not to be construed as limited to the particular construction illustrated.

What I claim is:—

1. As a new article of manufacture, a combined pressing and absorbing device for treatment of wet concrete and the like, comprising a relatively thin reticulated presser member formed of non-absorbent material, and a quantity of absorbent material arranged behind the presser member and capable of absorbing moisture in quantities substantial with relation to its own weight.

2. As a new article of manufacture, an apparatus for treating concrete and the like comprising a reticulated roller and a quantity of absorbent material therewithin capable of absorbing moisture in quantities substantial with relation to its own weight.

3. A concrete treating device comprising a hollow roller formed of relatively thin foraminated material, and absorbing means arranged within the roller and capable of absorbing moisture in quantities substantial with relation to its own weight.

4. A concrete treating device comprising a hollow roller formed of relatively thin permeable material, and a rollable absorbent element arranged within the roller capable of absorbing moisture in quantities substantial with relation to its own weight.

5. A concrete treating device comprising a hollow roller formed of relatively thin permeable material, and an inner absorbent roller arranged within said first mentioned hollow roller and capable of absorbing water in substantial quantities.

6. A concrete treating device comprising a hollow roller formed of permeable material, and a substantially cylindrical absorbent inner roller arranged within said first mentioned inner roller and comprising a casing of limp material, a quantity of absorbent material therein, and reenforcing means within said casing for maintaining the cylindrical form thereof.

7. A concrete treating device comprising a hollow roller formed of permeable material, and an absorbent inner roller of substantially cylindrical form arranged within the first and capable of absorbing water in substantial quantities.

8. A concrete treating device comprising a hollow roller formed of stiff permeable material, and an absorbent inner roller comprising a substantially cylindrical casing of limp permeable material, a quantity of absorbent therewithin, and reenforcing means within said casing for holding the same in substantially cylindrical form.

9. A concrete treating device comprising a roller formed of thin stiff reticulated material, and an absorbent inner roller adapted to roll inside the same, said inner roller comprising a substantially cylindrical permeable casing, and a quantity of loose absorbent material therewithin.

10. The process of treating concrete and the like which includes pressing a reticulated member thereagainst before the concrete is dry and with sufficient force to sink undesirably large elements in the concrete, simultaneously applying an absorbent above the reticulated member, and thereby absorbing through the reticulated member excess moisture in quantities adapted to substantially reduce the water-cement ratio.

11. A concrete treating device comprising a hollow roller formed of stiff permeable material, and an absorbent inner roller comprising a substantially cylindrical casing of limp permeable material, a quantity of absorbent therewithin, and reinforcing means within said casing for holding the same in substantially cylindrical form, such reinforcing means including hoop elements disposed at longitudinally spaced points along and within said casing.

12. A concrete treating device comprising a hollow roller formed of stiff permeable material, an absorbent inner roller comprising a substantially cylindrical casing of limp permeable material, a quantity of absorbent therewithin, means within said casing for holding the same in substantially cylindrical form, such reinforcing means including hoop elements disposed at longitudinally spaced points along and within said casing, and rigid tying means connecting said hoop elements.

13. A concrete treating device comprising a hollow roller formed of stiff permeable material, an absorbent inner roller comprising a substantially cylindrical casing of limp permeable material, a quantity of absorbent therewithin, reinforcing means within said casing for holding the same in substantially cylindrical form, such reinforcing means including hoop elements disposed at longitudinally spaced points along and within said casing, and rigid tying means connecting said hoops, at least certain of said hoops being of lesser diameter than the expanded casing.

14. A concrete treating device comprising a hollow roller formed of stiff permeable material, an absorbent inner roller comprising a substantially cylindrical casing of limp permeable material, a quantity of absorbent therewithin, reinforcing means within said casing for holding the same in substantially cylindrical form, such reinforcing means including hoop elements disposed at longitudinally spaced points along and within said casing, and resilient means outside at least certain of said hoops to safeguard the casing against abrasion.

15. A concrete treating device comprising a hollow roller formed of stiff permeable material, an absorbent inner roller comprising a substantially cylindrical casing of limp permeable material, a quantity of absorbent therewithin, reinforcing means within said casing for holding the same in substantially cylindrical form, such reinforcing means including hoop elements disposed at longitudinally spaced points along and within said casing, and rigid tying means connecting said hoops, at least certain of said hoops being of lesser diameter than the expanded casing, and being substantially centered therein whereby loose absorbent material within the casing may occupy space outside the hoops.

WILLIAM W. SCHUMACHER.